US008638806B2

(12) United States Patent
Wang et al.

(10) Patent No.: US 8,638,806 B2
(45) Date of Patent: Jan. 28, 2014

(54) WIRELESS MESH POINT PORTABLE DATA TERMINAL

(75) Inventors: Ynjiun P. Wang, Cupertino, CA (US); William H. Havens, Syracuse, NY (US); Huyu Qu, San Jose, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 272 days.

(21) Appl. No.: 12/125,621

(22) Filed: May 22, 2008

(65) Prior Publication Data

US 2008/0294766 A1    Nov. 27, 2008

Related U.S. Application Data

(60) Provisional application No. 60/931,850, filed on May 25, 2007.

(51) Int. Cl.
*G06F 15/173* (2006.01)

(52) U.S. Cl.
USPC .......................................... 370/419; 709/223

(58) Field of Classification Search
None
See application file for complete search history.

(56) References Cited

U.S. PATENT DOCUMENTS

| | | | |
|---|---|---|---|
| 5,029,183 A | 7/1991 | Tymes | |
| 5,157,687 A | 10/1992 | Tymes | |
| 5,479,441 A | 12/1995 | Tymes et al. | |
| 5,900,613 A | 5/1999 | Koziol et al. | |
| 5,943,322 A | 8/1999 | Mayor et al. | |
| 6,067,297 A | 5/2000 | Beach | |
| 6,298,176 B2 | 10/2001 | Longacre, Jr. et al. | |
| 6,405,927 B2 | 6/2002 | Sojka et al. | |

(Continued)

FOREIGN PATENT DOCUMENTS

| | | |
|---|---|---|
| EP | 1760958 | 3/2007 |
| EP | 1760958 A2 | 3/2007 |
| JP | 2007129690 | 5/2007 |

OTHER PUBLICATIONS

IEEE 802.11 Standard, Mar. 2007, pp. 59-255.*

(Continued)

*Primary Examiner* — Gregory Sefcheck
*Assistant Examiner* — Steve Young
(74) *Attorney, Agent, or Firm* — Additon, Higgins, Pendleton & Ashe, P.A.

(57) ABSTRACT

A portable data terminal (PDT) adapted to participate in a wireless mesh network including a plurality of peer PDTs can comprise: a PDT module including an encoded information reading (EIR) device, and a mesh point (MP) module communicatively coupled to the PDT module. The MP module can include a microcontroller and at least one wireless communication interface and can be configured to perform IEEE 802.11-conformant wireless station services including authentication, de-authentication, privacy, and MAC service data unit delivery, and IEEE 802.11-conformant wireless distribution system services including association, disassociation, distribution, integration, and re-association. The MP module can be further configured, responsive to receiving a MAC frame addressed to a recipient inside the wireless mesh network, to deliver the MAC frame using the distribution service. The MP module can be further configured, responsive to receiving a MAC frame addressed to a recipient outside of the wireless mesh network, to deliver the MAC frame using the integration service. The MP module can be further configured to route an incoming MAC frame according to its destination address and the frame control field. The MP module can be further configured to cause the PDT module to exit said sleeping state responsive to receiving a mobile management software (MMS) wake-up command.

15 Claims, 8 Drawing Sheets

(56) References Cited

U.S. PATENT DOCUMENTS

| | | | |
|---|---|---|---|
| 6,580,981 B1 | 6/2003 | Masood et al. | |
| 6,617,990 B1 | 9/2003 | Lorenzo-Luaces et al. | |
| 6,671,790 B2 | 12/2003 | Gay Sam et al. | |
| 6,687,259 B2 | 2/2004 | Alapuranen | |
| 6,728,232 B2 | 4/2004 | Hasty, Jr. et al. | |
| 6,728,545 B1 | 4/2004 | Belcea | |
| 6,754,188 B1 | 6/2004 | Garahi et al. | |
| 6,771,666 B2 | 8/2004 | Barker, Jr. | |
| 6,807,165 B2 | 10/2004 | Belcea | |
| 6,873,839 B2 | 3/2005 | Stanforth | |
| 7,039,358 B1 | 5/2006 | Shellhammer et al. | |
| 7,088,698 B1 | 8/2006 | Harsch | |
| 7,126,945 B2 | 10/2006 | Beach | |
| 7,327,705 B2* | 2/2008 | Fletcher et al. | 370/331 |
| 7,756,544 B1* | 7/2010 | Graham | 455/522 |
| 2002/0171745 A1 | 11/2002 | Ehrhart | |
| 2003/0132292 A1 | 7/2003 | Gomez et al. | |
| 2003/0161341 A1* | 8/2003 | Wu et al. | 370/448 |
| 2004/0004948 A1 | 1/2004 | Fletcher et al. | |
| 2004/0121648 A1* | 6/2004 | Voros | 439/535 |
| 2004/0218580 A1 | 11/2004 | Bahl et al. | |
| 2005/0063328 A1 | 3/2005 | Dunagan et al. | |
| 2005/0078690 A1* | 4/2005 | DeLangis | 370/401 |
| 2005/0272430 A1 | 12/2005 | Griebling | |
| 2006/0103344 A1* | 5/2006 | Hassan et al. | 320/103 |
| 2006/0258322 A1 | 11/2006 | Conner et al. | |
| 2006/0268746 A1 | 11/2006 | Wijting et al. | |
| 2007/0014269 A1* | 1/2007 | Sherman et al. | 370/338 |
| 2007/0045424 A1 | 3/2007 | Wang | |
| 2007/0050523 A1 | 3/2007 | Emeott et al. | |
| 2007/0125836 A1* | 6/2007 | McAllister et al. | 235/375 |
| 2007/0140279 A1 | 6/2007 | Yang et al. | |
| 2008/0247377 A1* | 10/2008 | Van Horn et al. | 370/348 |

OTHER PUBLICATIONS

Antonio G. Ruzzelli et al., A Low-Latency Routing Protocol for Wireless Sensor Networks, Adaptive Information Cluster, Smart Media Institute in the Department of Computer Science at University College Dublin, 2003, 6 pgs., Belfield, Dublin.

Atul Adya et al., Architecture and Techniques for Diagnosing Faults in IEEE 802.11 Infrastructure Networks, MobiCom '04 Sep. 26-Oct. 1, 2004, 15 Pgs., Philadelphia, Pennsylvania, USA.

C. Hedrick, Routing Information Protocol, Rutgers University, Jun. 1988, 29 pgs., New Jersey.

Christine E. Jones et al., A Survey of Energy Efficient Network Protocols for Wireless Networks, BBN Technologies, School of EECS at Washington State University, and Telcordia Technologies, 2001, 26 pgs.,Cambridge, MA, Pullman, WA, and Morristown, NJ.

Cisco Systems, Inc., Routing Information, Internetworking Technologies Handbook, Third Edition, Chapter 46, pp. 1-5., Dec. 1, 2001, Cisco Press, Indianapolis, IN.

D. Franco et al., A New Method to Make Communication Latency Uniform, Unviersitat Autònoma de Barcelona Department d'Informàtica, 1999, 10 pgs., Barcelona, Spain.

Eric Setton et al., Congestion-Optimized Multi-Path Streaming of Video Over Ad Hoc Wireless Networks, Information Systems Laboratory in the Department of Electrical Engineering at Stanford University, 2004, 4 pgs., Stanford, CA.

Eric Setton et al., Minimizing Distortion for Multi-Path Video Streaming Over Ad Hoc Networks, Information Systems Laboratory in the Department of Electrical Engineering at Stanford University, 2004, 4 pgs., Stanford, CA.

Eun-Sun Jung et al., Power Aware Routing Using Power Control in Ad Hoc Networks, Department of Computer Science at Texas A&M University and the Department of Electrical and Computer Engineering and Coordinated Science Laboratory, Feb. 2005, 8 pgs., College Station, TX and Urbana, IL.

G. Malkin, RIP Version 2, The Internet Society, Nov. 1998, 41 pgs.

Gerald Fry et al., Adaptive Routing of QoS-Constrained Media over Scalable Overlay Topologies, Powerpoint Slides, Boston University, 2003, 28 pgs., Boston, MA.

Jiancong Chen et al., Mixed-Mode WLAN: The Integration of Ad Hoc Mode with Wireless LAN Infrastructure, Department of Computer Science, Electrical & Electronic Engineering at the Hong Kong University of Science and Technology, 2003, 5 pgs., Clear Water Bay, Kowloon, Hong Kong.

Jharna Chokhawala et al., Optimizing Power Aware Routing in Mobile Ad Hoc Networks, Real-Time Systems Laboratory Department of Computer Science at the University of Houston-University Park, May 2004, 4 pgs., Houston, TX.

Jongman Kim et al., A Low Latency Router Supporting Adaptivity for On-Chip Interconnects, Department of Computer Science and Engineering at Pennsylvania State University, Jun. 2005, 6 pgs., University Park, PA.

Lawrence G. Roberts, The Next Generation of IP—Flow Routing, SSGRR 2003S International Conference, Jul. 29, 2003, 11 pgs., L'Aquila Italy.

Longbi Lin et al., Power Aware Pouting for Multi-hop Networks with Energy Replenishment, Purdue School of Electrical and Computer Engineering and the Department of Electrical and Computer Engineering at the University of Illinois at Urbana-Champaign 2004, 6 pgs.

Mike Woo et al., Power-Aware Routing in Mobile Ad Hoc Networks, Department of ECE at Oregon State University and Aerospace Corporation, 1998, 15 pgs., Carvallis, OR and El Segundo, CA.

Paramvir Bahl et al., SSCH: Slotted Seeded Channel Hopping for Capacity Improvement in IEEE 802.11 Ad-Hoc Wireless Networks, MobiCom '04 Sep. 26-Oct. 1, 2004, 15 Pgs., Philadelphia, Pennsylvania, USA.

Qun Li et al., Online Power-Aware Routing in Wireless Ad-hoc Networks, Department of Computer Science Dartmouth College, 2001, 10 pgs., Hanover, NH.

Ranveer Chandra, MultiNet: Connecting to Multiple IEEE 802.11 Networks Using a Single Radio, Cornell University, Mar. 2004, 7 Pgs., Ithaca, NY.

Ratul K. Guha et al., Fair Coalitions for Power-Aware Routing in Wireless Networks, Department of Engineering and Applied Science, Computer and Information Science, and Electrical Engineering at the University of Pennsylvania, Jul. 20, 2004, 21 pgs., Pennsylvania.

Sajith Balraj et al., Unicast Routing in Mobile Ad-Hoc Networks, Department of Computer Science and Engineering at the University of Buffalo, 2000, 11 pgs., Buffalo, NY.

Sven Hanemann et al., Reducing Packet Transmission in Ad Hoc Routing Protocols by Adaptive Neighbor Discovery, Department of Mathematics and Computer Science at the University of Marburg, 2003, 7 pgs., Marburg, Germany.

Victor Bahl et al., SSCH: Improving the Capacity of IEEE 802.11 Multihop Networks Using Slotted Seeded Channel Hopping, Powerpoint Slide, Jun. 23, 2004 1 Page.

Yuan Xue et al., A Location-Aided Power-Aware Routing Protocol in Mobile Ad Hoc Networks, Department of Computer Science at the University of Illinois at Urbana-Champaign and the Department of Electrical and Computer Engineering at the University of Toronto, 2001, 5 pgs., Illinois and Toronto, Canada.

Jangeun Jun, Mihail L. Sichitiu, Department of Electrical and Computer Engineering, North Carolina State University, Raliegh, NC 27695-7911, "MRP: Wireless Mesh Networks Routing Protocol", 34 pages.

Rob Flickenger, "Building Wireless Community Networks", Planning and Deploying Local Wireless Networks, Second Edition, Chapter three, pp. 19-38 (24 pages).

Joseph D. Camp, Edward W. Knightly, Electrical and Computer Engineering, Rice University, Houston, TX, The IEEE 802.11s Extended Service Set Mesh Networking Standard, 6 pages.

Prepared by the 802.11 Working Group of the IEEE 802 Committee, IEEE, 3 Park Avenue, New York, New York 10016-5997, "Draft Standard for Information Technology—Telecommunications and Information Exchange Between Systems—Local and Metropolitan area Networks—Specific Requirements—Part 11: Wireless LAN Medium Access Control (MAC) and Physical Layer (PHY) Specifications, Amendment <number>: Mesh Networking" 259 pages, 2007.

(56) References Cited

OTHER PUBLICATIONS

LAN MAN Standards Committee of the IEEE Computer Society, "Draft Standard for Information Technology—Telecommunications and Information Exchange Between Systems—Local and Metropolitan area Networks—Specific Requirements—Part 11: Wireless LAN Medium Access Control (MAC) and Physical Layer (PHY) Specifications", Reaffirmed by the IEEE-SA Standards Board, Jun. 12, 2003. 529 pages.

International Search Report, International Application No. PCT/US2008/064673, Dated Sep. 30, 2008, 4 pages.

Written Opinion of the International Searching Authority, International Application No. PCT/US2008/064673, Dated Sep. 30, 2008, 13 pages.

"Dolphin 9500/9550 Mobile Computer" [Online] Oct. 2003, 2 pages, URL: http://www.rescoelectronics.com/pdfs/9500_9550.pdf> retrieved on Sep. 12, 2008.

Patent Cooperation Treaty Office, International Preliminary Report on Patentability with Written Opinion, dated Dec. 1, 2009, (12 pgs.).

European Patent Office, Communication Pursuant to Article 94(3) EPC, dated Jul. 30, 2010 (5 pgs.).

Office Action in Chinese Application No. 200880100339.1, dated Jun. 21, 2013, 9 pages (with English translation).

\* cited by examiner

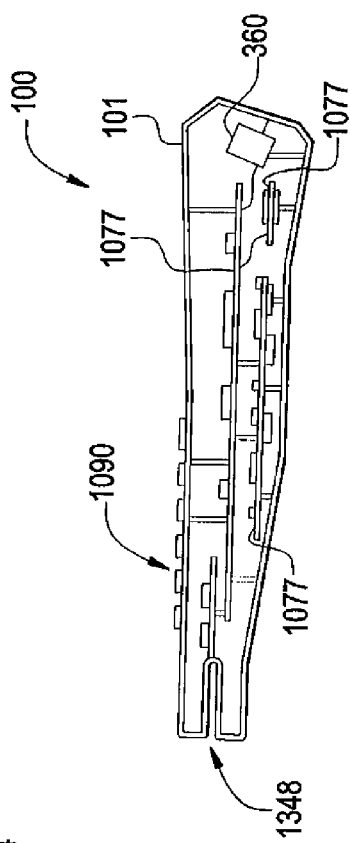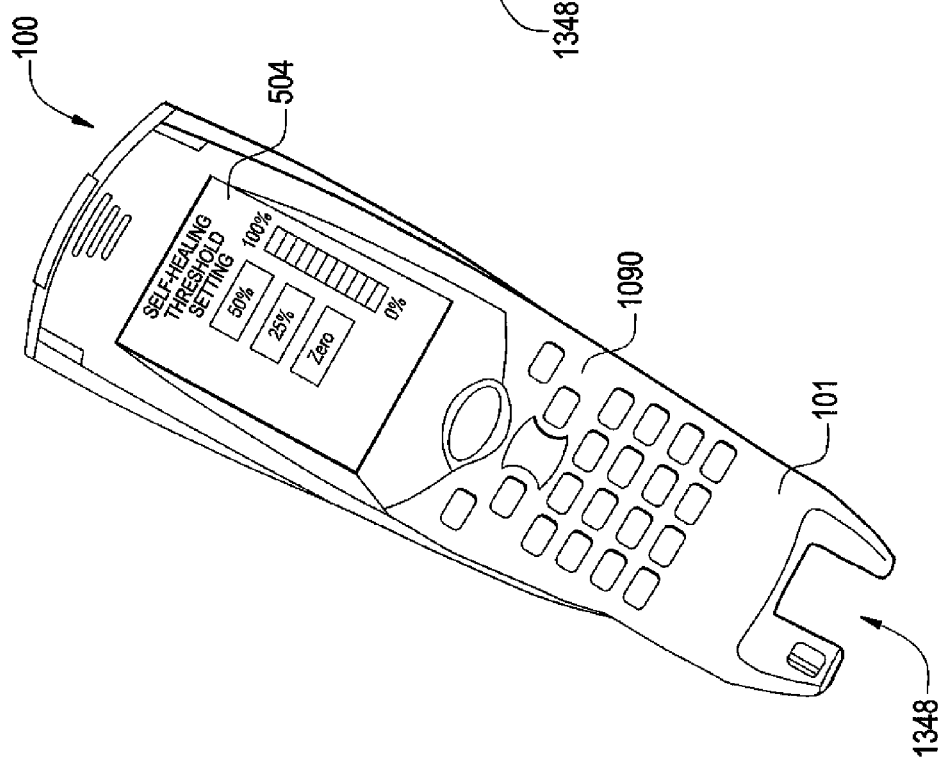

WIRELESS MESH POINT PORTABLE DATA TERMINAL

CROSS REFERENCE TO RELATED APPLICATIONS

This application claims priority under 35 U.S.C. §119(e) of the following provisional application: U.S. Ser. No. 60/931,850, filed May 25, 2007, entitled "Wireless Mesh Point Data Collection Device Terminal", the content of which is incorporated herein by reference.

FIELD OF THE INVENTION

The invention is generally related to data collection systems employing portable data terminals and is specifically related to a system and method of wireless data communication in a data collection system employing portable data terminals.

BACKGROUND OF THE INVENTION

In recent years significant advances have been made in the art of data collection devices and networks containing the same.

In U.S. Pat. No. 5,900,613, a data collection device system is described having a data collection device adapted to read bar code data wherein the data collection device is in communication with a local host processor and a remote host processor. The data collection device of U.S. Pat. No. 5,900,613 is configured to report bar code data to a remote computer and execute reprogramming routines to receive program data either or both from the remote host processor and the local host processor.

In U.S. Pat. No. 6,298,176, a data collection device system is described having a bar code reading device and a host computer. The bar code reading device is equipped to send bar code data and associated image data to the host. The image data may contain digital images associated with transmitted bar code data. In one example described in U.S. Pat. No. 6,298,176, image data sent to a host includes image data representing a handwritten signature.

In U.S. Publication No. US2002/0171745, a data collection device system is described having a bar code reading device which is in communication with a remote computer. The bar code reading device sends image data and associated bar code data to a remote computer. In one combined bar code/image data transmission scheme described in the above patent application publication decoded bar code message data identifying a parcel is stored within an open byte header location of an image file including an image representation of the parcel.

In U.S. Publication No. US2002/0171745, an image data file in .PDF, .TIFF, or .BMP file format is created at a data collection device which includes an image representation of a decoded bar code message and an image representation of the package including the bar code encoding the decoded message.

In U.S. Publication No. US2003/0132292, a data collection device is described having a data collection terminal including a bar code reading device, an RFID reading device, a magnetic stripe data reading device, a chip card reading device, and a fingerprint reading device. The terminal is coupled to a network, which is configured to facilitate financial transactions involving data collected utilizing the various reading devices.

In U.S. Publication No. US2007/0045424, a data collection system is described comprising a plurality of data collection devices and an access point. The access point can be a wireline connected to a local server so that the access point provides access to local and remote server applications and databases. Each of the system's data collection devices can have an encoded information reader device and a dynamic access module. The dynamic access module, among other functions, enables a data collection device to receive a Media Access Control (MAC) frame containing payload data from a peer device and transmit that payload data to a system access point and similarly receive a MAC frame containing payload data from an access point and transmit that payload data to a peer device.

As significant as the above developments are, shortcomings have been noted with the operation of presently available data collection devices and the systems in which they are incorporated. For example, while wireless data collection systems have proliferated, connectivity issues remain with such systems. In deploying a wireless data collection system, a costly "site survey" is often commissioned to search for "dead zones" in work environments. Dead zones are prevalent in many data collection work environments, particularly where obstructions to free radio wave propagation exist. Metal structures and water are known to obstruct the free propagation of radio waves. Since metallic structures (e.g., shelving, equipment including medical test equipment) and water (plumbing and piping) are common in data collection work environments, data collection work environments are often found to have numerous dead zones. Where a data collection work environment to be serviced by an IEEE 802.11 wireless communication system is found to have numerous "dead zones," the "solution" proposed by a site surveyor is often to integrate numerous additional access points into the system. The additional access points are costly and typically require connection to an expanded wireline bus. In many data collection systems the number of integrated access points is equal or greater than the number of data collection devices.

Accordingly, there is a need for further advances in data collection devices and systems in which they are connected, and management of data collected utilizing such networks.

SUMMARY OF THE INVENTION

A portable data terminal (PDT) adapted to participate in a wireless mesh network including a plurality of peer PDTs can comprise: a PDT module including an encoded information reading (EIR) device, and a mesh point (MP) module communicatively coupled to the PDT module. The MP module can include a microcontroller and at least one wireless communication interface and can be configured to perform IEEE 802.11-conformant wireless station services including authentication, de-authentication, privacy, and MAC service data unit delivery, and IEEE 802.11-conformant wireless distribution system services including association, disassociation, distribution, integration, and re-association. The MP module can be further configured, responsive to receiving a MAC frame addressed to a recipient inside the wireless mesh network, to deliver the MAC frame using the distribution service. The MP module can be further configured, responsive to receiving a MAC frame addressed to a recipient outside of the wireless mesh network, to deliver the MAC frame using the integration service. The MP module can be further configured to route an incoming MAC frame according to its destination address and the frame control field. The MP module can be further configured to cause the PDT module to exit said sleeping state responsive to receiving a mobile management software (MMS) wake-up command.

In another aspect, a PDT adapted to participate in a wireless mesh network including a plurality of peer PDTs can comprise: a PDT module including a central processing unit (CPU), a memory, and at least one EIR device. The EIR device can be configured to output a decoded message data corresponding to an encoded message. The PDT can further comprise a MP module communicatively coupled to the PDT module. The MP module can include a microcontroller and at least one wireless communication interface. The MP module can be configured to perform IEEE 802.11-conformant wireless station services, and IEEE 802.11-conformant wireless distribution system services. The MP module can be further configured to route an incoming MAC frame according to its destination address and the frame control field.

In another aspect, there is provided a PDT adapted to participate in a wireless mesh network including a plurality of peer PDTs. The PDT according to the invention can comprise: a PDT module including a CPU, a memory, and at least one EIR device. The EIR device can be configured to output a decoded message data corresponding to an encoded message. The PDT can further comprise a mesh point MP module communicatively coupled to the PDT module. The MP module can include a microcontroller and at least one wireless communication interface. The PDT module can be configured to control its power management states at least between an awake state and a sleeping state. The MP module can be configured to cause the PDT module to exit the sleeping state responsive to receiving a MMS wake-up command.

In another aspect, there is provided a dynamic deployable mesh point adapted to participate in a wireless mesh network including a plurality of portable data terminals. The dynamic deployable mesh point can comprise a microcontroller and at least one wireless communication interface. The dynamic deployable mesh point can be configured to perform IEEE 802.11-conformant wireless station services including authentication, de-authentication, privacy, and MAC service data unit delivery, and IEEE 802.11-conformant wireless distribution system services including association, disassociation, distribution, integration, and re-association. The dynamic deployable mesh point can be further configured, responsive to receiving a MAC frame addressed to a recipient inside the wireless mesh network, to deliver the frame using the distribution service. The dynamic deployable mesh point can be further configured, responsive to receiving a MAC frame addressed to a recipient outside of the mesh network, to deliver the frame using the integration service. The dynamic deployable mesh point can be substantially devoid of any functionality other than routing MAC frames.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 6a and 6b illustrate an exemplary hand held portable data collection device housing into which all of the components of FIG. 1 may be integrated;

DETAILED DESCRIPTION OF THE INVENTION

Figure 1:
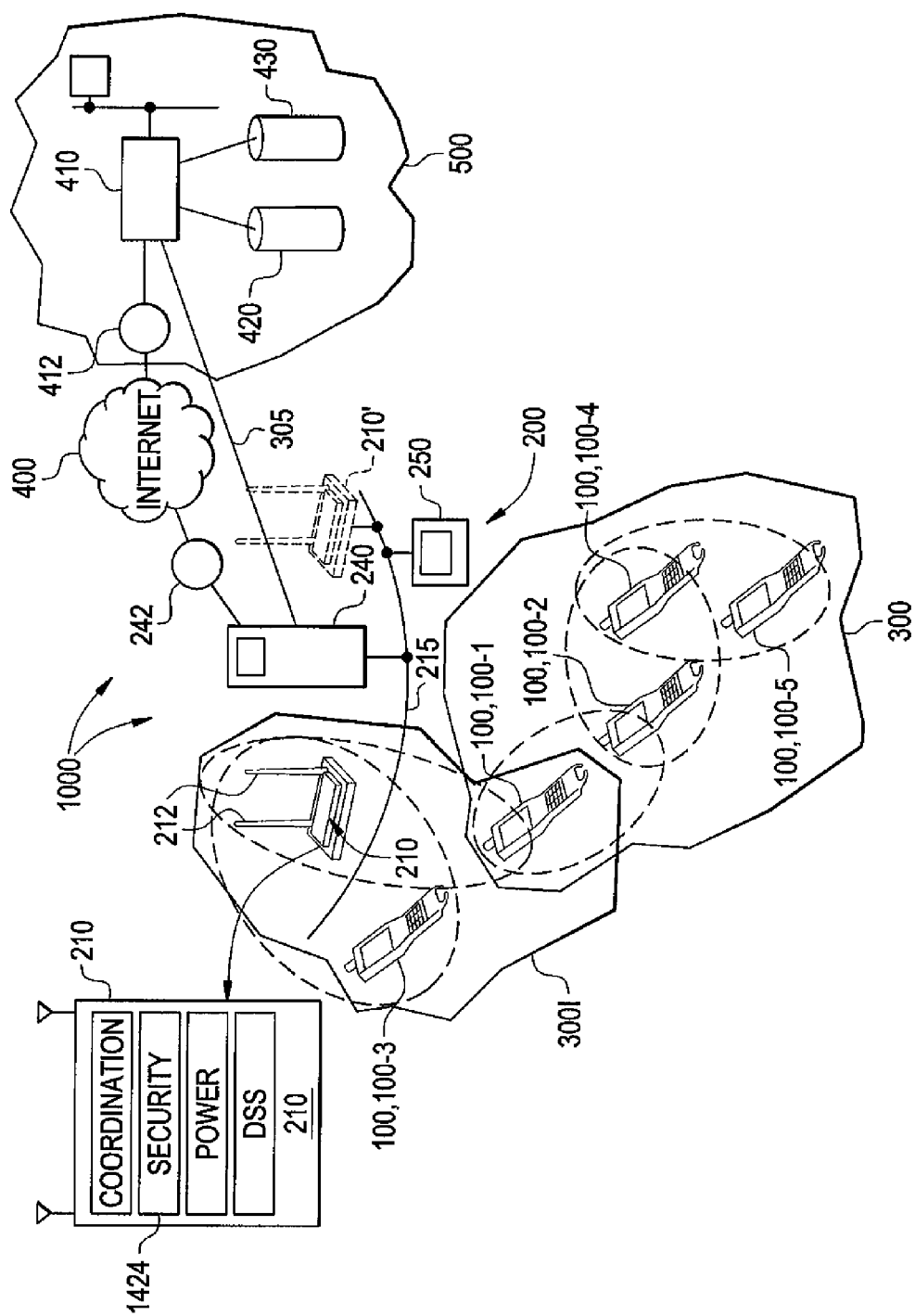
FIG. 1 illustrates a data collection system according to the invention.

There is provided a data collection system comprising a plurality of PDTs as shown in FIG. 1. A PDT can be provided, for example, by a bar code scanner, a personal data assistant (PDA), or a cellular telephone. A skilled artisan would appreciate the fact that other portable computing devices are within the scope and the spirit of the invention. The data collection system according to the invention can include more than one such type or category of PDT.

As shown in FIG. 1, the data collection system 1000 can include a plurality of networks 200, 300I, 300, 400, and 500. Network 200 is a wireline local area network (LAN), networks 300 and 300I are IEEE 802.11-compliant wireless networks, network 400 is an IP network shown in the specific embodiment as the Internet, and network 500 is a remote data archiving network managed by a data archiving entity. The data collection system 1000 can include a plurality of PDTs 100-1, 100-2, 100-3, 100-4, 100-5 and an access point (AP) 210. The AP 210 can function as a portal interconnecting the LAN 200 and the wireless network 300I. The wireline LAN 200 can also include a server 240 and a plurality of computer devices such as a personal computer (PC) 250. As will be described more fully herein, wireless network 300I in the specific illustrative embodiment of FIG. 1 can include the APs 210, 210', PDT 100-1, and PDT 100-3 whereas the wireless network 300 can includes PDTs 100-1, 100-2, 100-4, 100-5. The data collection system 1000 may also include a gateway 242 between network 200 and network 400 and a gateway 412 between network 400 and network 500. While different "networks" are designated herein, it is recognized that a single network as seen from the network layer 3106 of the OSI model (FIG. 2) can comprise a plurality of lower layer networks, e.g., what can be regarded as a single IP network can include a plurality of different physical networks.

Figure 2:
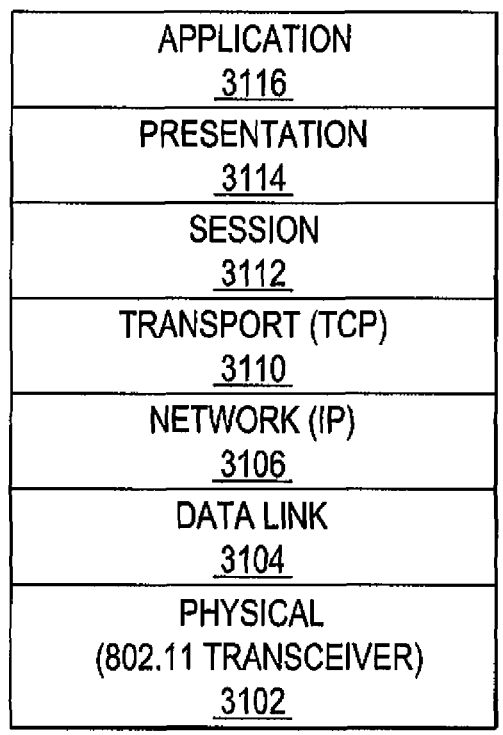
FIG. 2 illustrates the Open Systems Communication (OSI) network model.

The OSI model diagram is shown in FIG. 2. According to the OSI network layer model, data protocols may be implemented in one of seven layers; i.e., the physical layer 3102 the link layer 3104, the network layer 3106 (can provided by, e.g., IP), the transport layer 3110 (can provided by, e.g., TCP or UDP), the session layer 3112, the presentation layer 3114, and the application layer 3116.

Referring to further aspects of the networks of the data collection system 1000, network 500 can be located remotely from the network 200 and can be located thousands of miles from network 200. Network 500, for example, can include a web server 410, which can be in communication with various databases 420, 430. Network 500 can be in communication with network 200 via the Internet 400 or another communications path, such as a publicly accessible network, and/or through a private network, such as network 305. A network included into the data collection system 1000 can be interconnected with other networks using both OSI layer 2 bridging and OSI layer 3 internetworking.

In one embodiment of the invention, AP 210 of system 1000 can be compliant with one of the IEEE 802.11, 802.11a, 802.14, 802.11g, 802.11e, and 802.11i Specifications. Each PDT 100 of the data collection system 1000 can incorporate a radio transceiver which can be compliant with one of the IEEE 802.11, 802.11a, 802.14, 802.11g, 802.11e, and 802.11i Specifications, and can have an associated unique Internet Protocol (IP) address.

Referring to attributes of the AP 210, AP 210 can be wireline connected to server 240 via wireline network 215 shown throughout the views and in communication with remote server 410 via network 400. Thus, communication with AP 210 can provide access to all files and applications stored on server 240 or server 410. AP 210 can be designed to have a large antennae 212 boosting the transmit and receive range and throughput of data through AP 210. Wireline network 215, can be provided by e.g., an Ethernet cable, to form a backbone of the network 200.

AP 210 may also be implemented with enhanced security features. According to a security feature (e.g., the Wired Equivalency Privacy (WEP) feature, where AP 210 is IEEE 802.11-compliant), AP 210 may incorporate a security module 1424 which can enable AP 210 to encrypt MAC frames transmitted to a network device (e.g., a PDT) and decrypt MAC frames received from a network device (e.g., a PDT). In accordance with the security module 1424, AP 210 may examine a control field of a received MAC frame to determine if a security feature (e.g., WEP) is enabled, and if it is enabled, decrypt the received MAC frame.

In another aspect, a PDT according to the invention can be capable of performing MP functionality defined in IEEE P802.11s family of draft standards, including IEEE P802.11s D0.01, D1.02, and D2.0, Draft amendments to standard IEEE 802.11™: ESS Mesh Networking. IEEE. Thus, a PDT according to the invention can establish wireless links with one or more peer PDTs and route a MAC frame received from one peer PDT to another peer PDT or to an AP, so that the MAC frame can finally reach its destination within or outside the wireless network.

In a further aspect, a PDT can support IEEE 802.11-conformant wireless station services, including authentication, deauthentication, privacy, and MAC service data unit (MSDU) delivery. Each of the services is briefly described herein infra.

Authentication: Physical security can not be effectively employed to prevent unauthorized access to a wireless network since the wireless medium does not have precise bounds. IEEE 802.11 provides the ability to control network access via the authentication service. This service can be used by all wireless devices to establish their identity to other wireless devices with which they communicate. IEEE 802.11 supports several authentication processes, but does not mandate the use of any particular authentication scheme. IEEE 802.11 provides link-level authentication between IEEE 802.11 wireless devices, e.g., a shared key authentication. In a shared key authentication system, identity is demonstrated by knowledge of a shared secret encryption key.

Deauthentication: The deauthentication service is invoked whenever an existing authentication is to be terminated.

Privacy: Any IEEE 802.11-conformant wireless device may hear all IEEE 802.11 traffic that is within its radio range. Thus the connection of a single wireless link (without privacy) to an existing wired LAN may seriously degrade the security level of the wired LAN. To bring the functionality of the wireless LAN up to the level implicit in wired LAN design, IEEE 802.11 provides the ability to encrypt the contents of MAC frames. This functionality is provided by the privacy service. IEEE 802.11 specifies an optional privacy algorithm, WEP, which is designed to satisfy the goal of wired LAN "equivalent" privacy.

In a further aspect, a PDT can further support IEEE 802.11-conformant distribution system services, including association, disassociation, distribution, integration, and reassociation, and thus act as an AP. Each of the services is briefly described herein infra.

Association: To deliver a MAC frame within a wireless network, the distribution service needs to know which AP or portal to access for the given wireless device. This information can be provided by the association service. Before a wireless device is allowed to transmit a MAC frame via an AP or a portal, it shall first become associated with the AP or the portal. At any given time, a wireless device can be associated with no more than one AP or portal. An AP or a portal may be associated with many wireless devices at one time.

Disassociation: The disassociation service is invoked whenever an existing association is to be terminated. The disassociation service may be invoked by either party to an association (wireless device or AP).

Distribution: the distribution service delivers the MAC frame within a wireless network to the intended recipients.

Integration: If the distribution service determines that the intended recipient of a MAC frame is on a network integrated with the wireless network where the MAC frame originates, the MAC frame will need to be routed via a portal interconnecting the wireless network with the integrated network. The integration function is responsible for accomplishing whatever is needed to deliver a MAC frame to the integrated network.

Reassociation: Association is sufficient for no-transition MAC frame delivery between IEEE 802.11 devices. Additional functionality is needed to support device transition mobility. The additional required functionality is provided by the reassociation service which is invoked to "move" a current association from one AP or portal to another.

Figure 3:
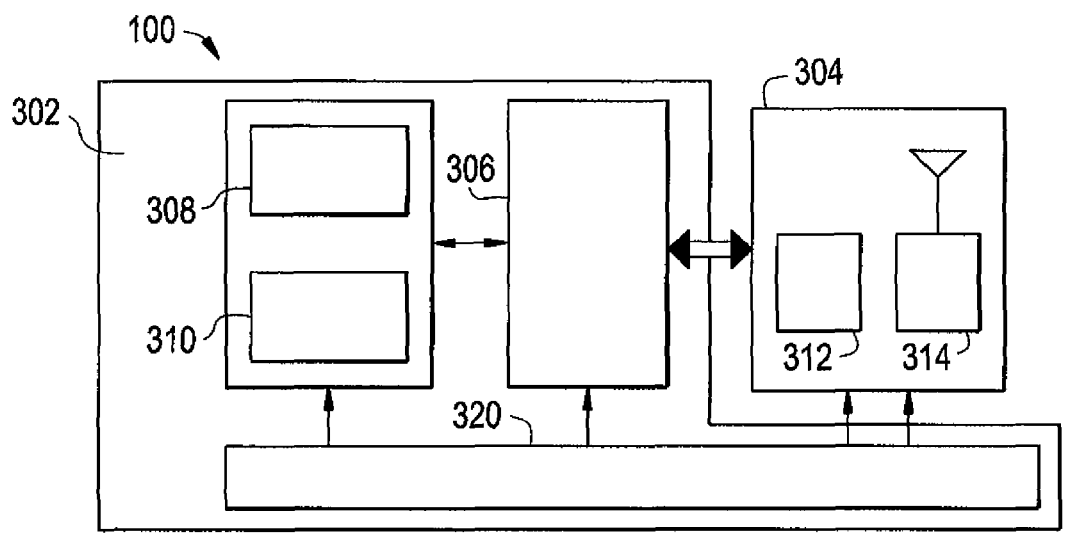
FIG. 3 illustrates an architectural diagram of a PDT according to the invention.

In a further aspect, a PDT 100 according to the invention can comprise a PDT module 302 communicatively coupled to an MP module 304, as shown in FIG. 3. In one embodiment, the PDT module can be communicatively coupled to the MP module over a wired interface. In another embodiment, the PDT module can be communicatively coupled to the MP module over a wireless interface, e.g., an optical interface or a radio frequency (RF) interface. A skilled artisan would appreciate the fact that other implementations of the interface between the MP module and the PDT module are within the scope and the spirit of the invention.

The PDT module 302 can include a CPU 306, a memory 308, and an EIR device 310. The EIR device 310 can be provided by one or more of a bar code reader device, an RFID reader device, and a credit/debit card reader device. In one embodiment, a bar code reader device can be provided by an imaging assembly and a control circuit which can manage the capture of image data into a memory and the subsequent decoding of image data in accordance with a symbology decoding program stored in the memory. A bar code reader device may also be provided by a product having dedicated decode circuit such as an IT 4XXX or IT 5XXX imaging module with decode circuit as is available from Hand Held Products, Inc. of Skaneateles Falls, N.Y. The decode circuit can process image signals generated by the imaging module and decode the signals to produce decoded message data, such as decoded bar code message data from numerous symbologies such as PDF417, MicroPDF417, MaxiCode, Data Matrix, QR Code, Aztec, Aztec Mesa, Code 49, UCC Composite, Snowflake, Dataglyphs, Code 39, Code 128, Codabar, UPC, EAN, Interleaved 2 of 5, RSS, Code 93, Codablock, BC 412, Postnet (US), Planet Code, BPO 4 State, Canadian 4 State, Japanese Post, Kix (Dutch Post) and OCR-A, OCR-B.

In another aspect, a PDT according to the invention can include a power source (e.g., a battery 320 best viewed in FIG. 3).

In a further aspect, the MP module 304 of FIG. 3 can function as an IEEE 802.11s-conformant MP. Hence, a wireless network formed by PDTs acting as MPs can provide a set of IEEE 802.11s-conformant mesh services, including the management of the mesh and the transport of MAC frames. In a further aspect, the MP module 304 can comprise a low power embedded microcontroller 312 to perform 802.11s MP functionality independently of the current power management state of the PDT module. The MP module 304 can further comprise at least one wireless communication interface 314.

In a further aspect, the MP module of a PDT can receive a frame (e.g., a MAC frame) from the PDT module of the same PDT, from a peer PDT, or from an AP or portal. The PDT can route the frame using the distribution service to a recipient within the same wireless network, or using the integration service to a recipient outside of the wireless network.

In another aspect, the MAC frames transmitted and received by a PDT can belong to one of the three IEEE 802.11MAC sublayer message types—data, management, and control. The data messages are handled via the MAC data service path. MAC management messages are used to support the IEEE 802.11 services and are handled via the MAC management service data path. MAC control messages are used to support the delivery of IEEE 802.11 data and management messages.

Figure 4A:
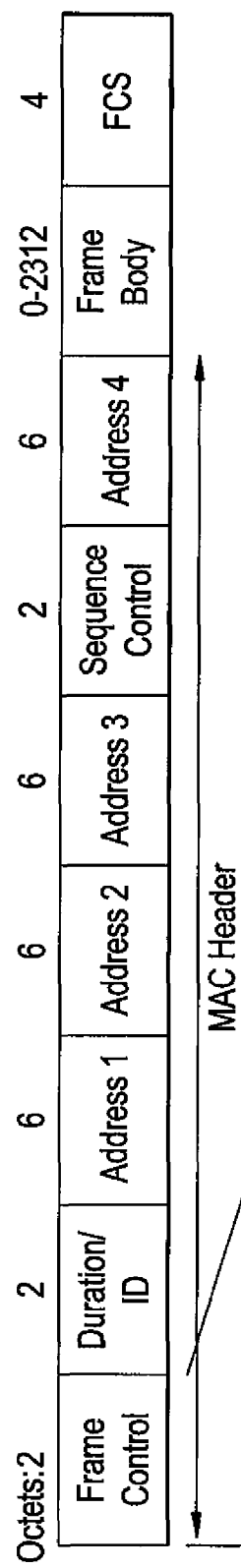
FIG. 4a illustrates IEEE-802 MAC frame format.

Each MAC frame consists of the following basic components, illustrated in FIG. 4a:

a) a MAC header, which comprises frame control, duration, address, and sequence control information;

b) a variable length frame body, which contains information specific to the frame type;

c) a frame check sequence (FCS), which contains an IEEE 32-bit cyclic redundancy code (CRC).

Figure 4B:
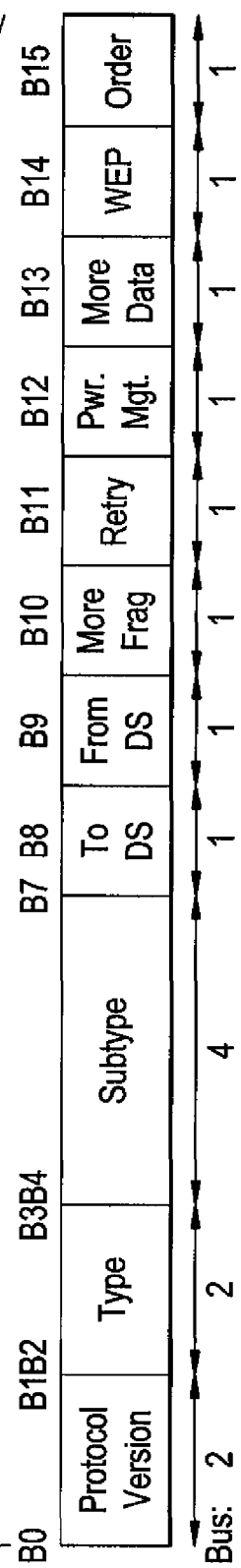
FIG. 4b illustrates IEEE-802 MAC frame control field format.

The Frame Control field consists of the following subfields: Protocol Version, Type, Subtype, To DS, From DS, More Fragments, Retry, Power Management, More Data, WEP, and Order. The format of the Frame Control field is illustrated in FIG. 4b.

A PDT can route a MAC frame according to its destination address and the frame control field of the frame header as shown in the following table.

| Type value b3 b2 | Type description | Subtype value b7 b6 b5 b4 | Subtype description |
|---|---|---|---|
| 00 | Management | 0000 to 1100 | Management Message |
| 01 | Control | 0110 to 1111 | Control both for WLAN and Mesh |
| 10 | Data | 0000 to 0111 | MPDT Data |
| 11 | Mesh Data | 0000 to 0001 | Mesh Data |

In another aspect, the MP module and the PDT module of a PDT might share the same IP address. In one embodiment, the routing algorithms between the MP module and the PDT module can be as follows:

If the PDT module has an outgoing frame, the frame is put into the input FIFO of the MP module and queued for the MP module to transmit the frame.

If the MP module receives an incoming frame with its own destination address, the frame is transmitted to the PDT module.

In another aspect, a PDT according to the invention can have a single power supply (e.g., a battery 320 best viewed in FIG. 3) for both MP and PDT modules. In another embodiment, each of the MP and PDT modules can have separate power supplies (e.g., batteries) controlled by independent power management schemes or a single coordinated power management scheme. For example, in one embodiment of a coordinated power management scheme, if the MP module energy source is depleted, the PDT module energy source may be used to supply power to the MP module to provide for continued mesh network functionality. In another embodiment, if the PDT module energy source is depleted, then the MP module energy source may be used to supply power to the PDT provide for its continued operation.

In another aspect, a PDT according to the invention can support power management control aimed at saving energy. In one embodiment, while the PDT module can transition into a sleeping state when it has no job to process, the MP module can remain operational to provide the mesh routing functionality. If a frame (e.g., a MAC frame) received by an MP module is not addressed to the PDT module of the same PDT, the MP module can route the frame to its destination using distribution or integration service. If the incoming frame is addressed to the PDT module of the same PDT, the MP module can route the frame to the PDT module. If the PDT module is in a sleeping state, the MP module can cause the PDT module to exit the sleeping state and to transition to an awake state by transmitting the frame to the PDT module.

In a further aspect, a PDT according to the invention can support one or more of the following power saving features:

a) Reducing the frequency of beacons, e.g., by beaconing only at Delivery Traffic Indication Message (DTIM) intervals;

b) Providing efficient power save mode advertising, e.g., by including an indication of the power save mode into the beacon frames or the frame control field;

c) Allowing MPs to be awake only for that portion of time required for actual reception.

In another aspect, a MMS server can be employed by the data collection system according to the invention for performing management functions including application updates and reloads, device reconfigurations and resets, etc.

In one embodiment, a PDT according to the invention can exit the sleeping state and transition to the awake state responsive to receiving an MMS awake command. In a further aspect, the MMS server can issue a command to immediately wake up all of the PDTs participating in the data collection system according to the invention.

In another embodiment, a PDT according to the invention can be devoid of the PDT module and thus provide MP module functions only. The apparatus according to the invention which is devoid of the PDT module will be referred to as a dynamic deployable MP. One or more dynamic deployable mesh points can be installed within the data collection system according to the invention with the purpose of extending the RF signal coverage or enhancing the mesh network density and throughput. For example, a dynamic deployable mesh point can be installed at a "blind spot" of an existing wireless network. In another embodiment, one or more dynamic deployable mesh points can be used to roll out a temporary network in a situation where a permanent network does not exist or could not be installed. In one example, a temporary network using dynamic deployable mesh points can be deployed in a warehouse where the inventory needs to be taken. In another example, a temporary network using dynamic deployable mesh points can be deployed in a hospital ward. In a further example, a temporary network using dynamic deployable mesh points can be deployed in a military combat or field training environment.

A dynamic deployable mesh point according to the invention can support IEEE 802.11-conformant wireless station services, including authentication, deauthentication, privacy, and MAC service data unit (MSDU) delivery. In a further aspect, a dynamic deployable MP according to the invention can further support IEEE 802.11-conformant distribution system services, including association, disassociation, distribution, integration, and reassociation.

In a further aspect, a dynamic deployable mesh point according to the invention can be capable of performing mesh point functionality defined in IEEE 802.11s family of draft standards, including IEEE P802.11s D0.01, D1.02, and D2.0, Draft amendments to standard IEEE 802.11™: ESS Mesh Networking. IEEE. Thus, a dynamic deployable mesh point according to the invention can establish wireless links with one or more wireless devices (e.g., PDTs or other dynamic deployable MPs) and route incoming MAC frames, so that the MAC frames can finally reach its destination within or outside the wireless network. In one aspect, a dynamic deployable MP can be substantially devoid of any non-trivial functionality other than routing incoming frames.

In a further aspect, the dynamic deployable MP can route an incoming frame (e.g., a MAC frame) using the distribution service to a recipient within the same wireless network, or using the integration service to a recipient outside of the wireless network.

Figure 5:
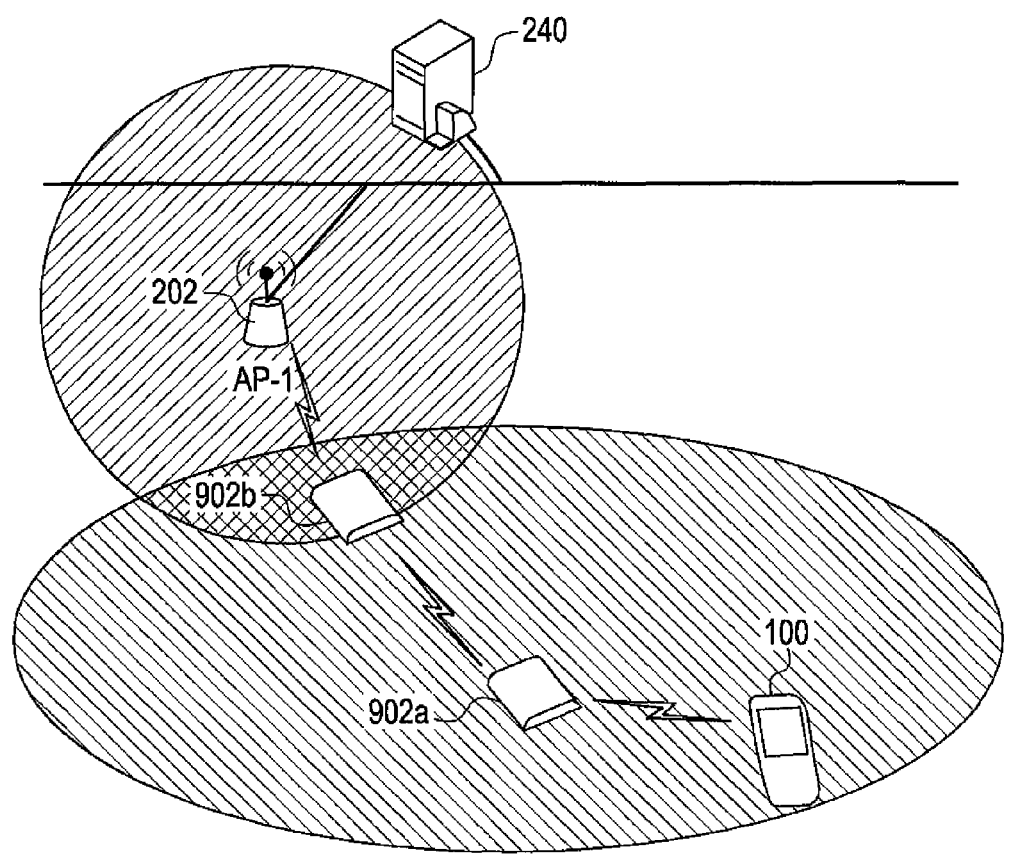
FIG. 5 illustrates a data collection system including a dynamic deployable mesh point according to the invention.

In one embodiment, illustrated in FIG. 5, a PDT 100 can be located outside of the coverage of the AP 202. According to the invention, a dynamic deployable mesh point 902a, responsive to receiving a frame (e.g., a MAC frame) from a PDT 100, can route the frame to the dynamic deployable mesh point 902b, which in turn can route the frame to the AP 202 so that the frame can be finally routed to the server 240. A skilled artisan would appreciate the fact that frames addressed to the PDT 100 can also be routed via the dynamic deployable mesh points 902a and 902b.

In another aspect, a dynamic deployable MP according to the invention can be self-configurable. Upon being powered up, the dynamic deployable mesh point can automatically update its routing table, automatically associate with a wireless network, and start routing incoming frames (e.g., MAC frames). In another embodiment, a dynamic deployable mesh point can be remotely configurable over the network.

In another aspect, a dynamic deployable mesh point according to the invention can be characterized by small physical size and low power consumption. In one embodiment, a dynamic deployable MP according to the invention can be powered by a battery. In another embodiment, a dynamic deployable MP can be plugged into an electrical outlet.

A dynamic deployable MP according to the invention can be further characterized by a low cost, and thus provide a cost-effective solution for flexible on-demand management of a wireless network coverage and throughput.

Figure 7A:
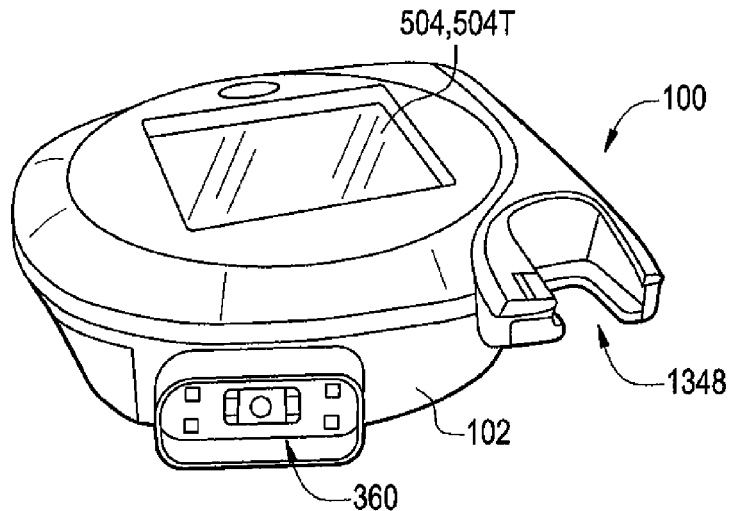
FIGS. 7a-7c illustrate an exemplary portable and remountable housing into which all of the components of FIG. 3 may be integrated, and which may support all of the components of FIG. 3.
Figure 7B:
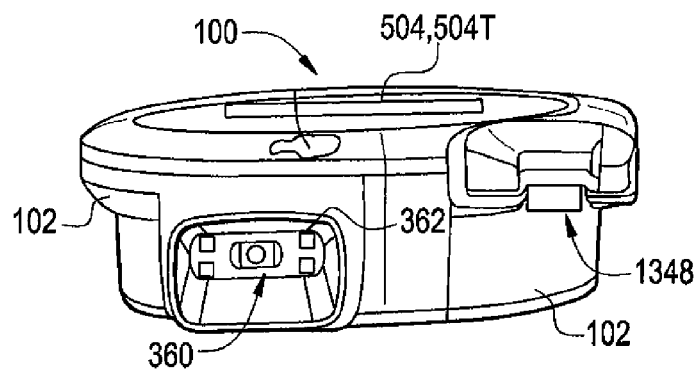
Figure 7C:
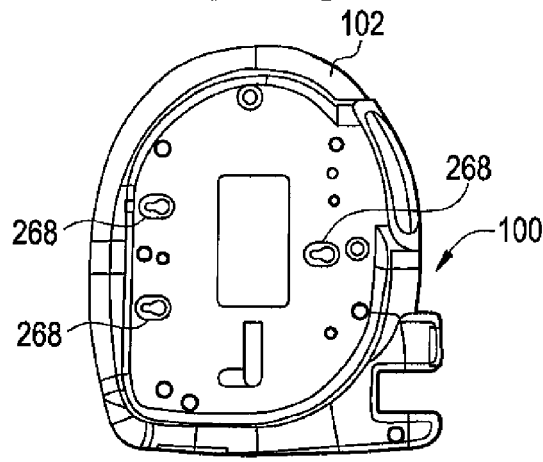

In another aspect, the components of a PDT according to the invention can be incorporated into a variety of different housings. As indicated by the embodiment of FIGS. 6a and 6b, the components of a PDT according to the invention can be incorporated into a hand held housing 101 as shown in FIGS. 6a and 6b which is shaped to be held in a human hand. PDT 100 of FIGS. 6a and 6b is in the form factor of a hand held portable data terminal. PDT 100 as shown in FIGS. 6a and 6b can include a keyboard 1090 a display 504 having an associated touch screen overlay, a card reader 1348 and an imaging module 360 which can include the components of an imaging assembly as described herein; namely an image sensor array incorporated on an image sensor IC chip. As indicated by the side view of FIG. 6b, the components of a PDT according to the invention may be supported within housing 101 on a plurality of circuit boards 1077. In the embodiment of FIGS. 7a-7c, PDT 100 is in the form of a transaction terminal which may be configured as a retail purchase transaction terminal or as a price verifier. Housing 102 of the transaction terminal shown in FIGS. 7a-7c can be configured to be portable so that it can be moved from location to location and is further configured to be replaceably mounted on a fixed structure such as a fixed structure of a cashier station or a fixed structure of the retail store floor (e.g., a shelf, a column 264). Referring to bottom view of FIG. 7c, the housing 102 of PDT 100 can have formations 268 facilitating the replaceable mounting of PDT 100 on a fixed structure. PDT 100 can include a display 504 having an associated touch screen 504T, a card reader 1348, and an imaging module 360. Referring to further details of PDT 100, PDT 100 can further include a luminous shroud 362. When light from illumination block (not shown in FIGS. 7a, 7b, 7c) strikes luminous shroud 362, the shroud glows to attract attention to the location of imaging assembly. In certain operating modes as indicated in FIG. 8c, PDT 100 in accordance with any of FIGS. 6a-7c, displays on display 504 a PIN entry screen prompting a customer to enter PIN information into touch screen 504T. In other operating modes, as indicated in FIG. 8d, PDT 100 displays on display 504 a signature prompt screen prompting a customer to enter signature information into the device with use of a stylus 505.

Figure 8A:
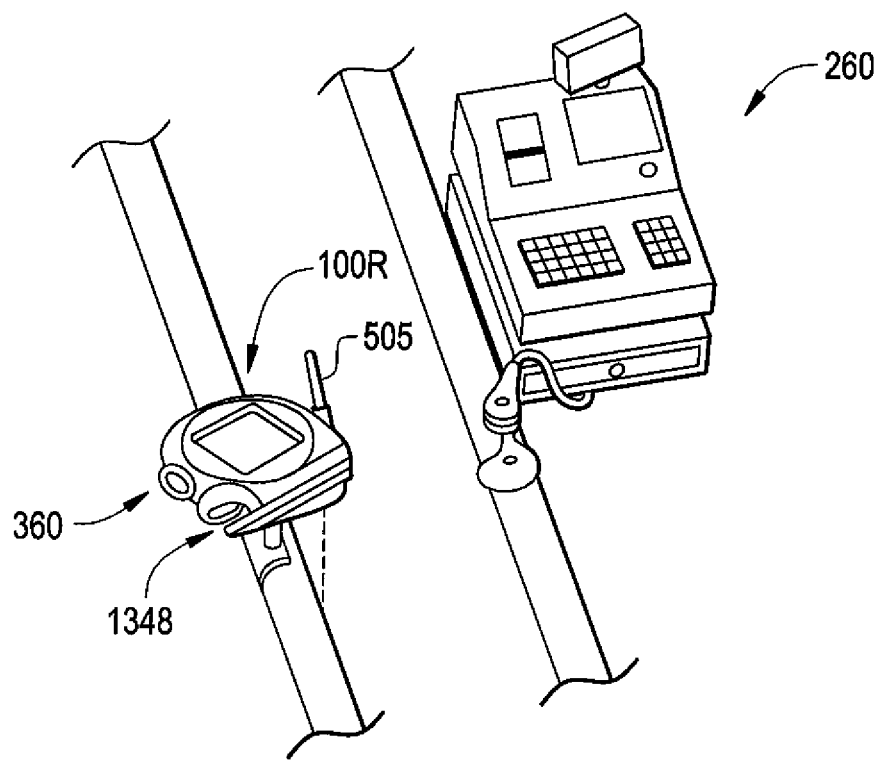
FIG. 8a illustrates a first exemplary deployment of a data collection device according to the invention within a retail store.
Figure 8B:
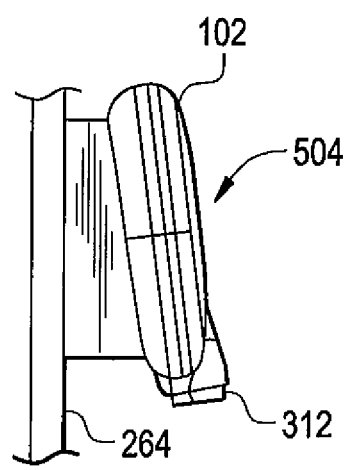
FIG. 8b illustrates a second exemplary deployment of a data collection device according to the invention within a retail store.
Figure 8C:
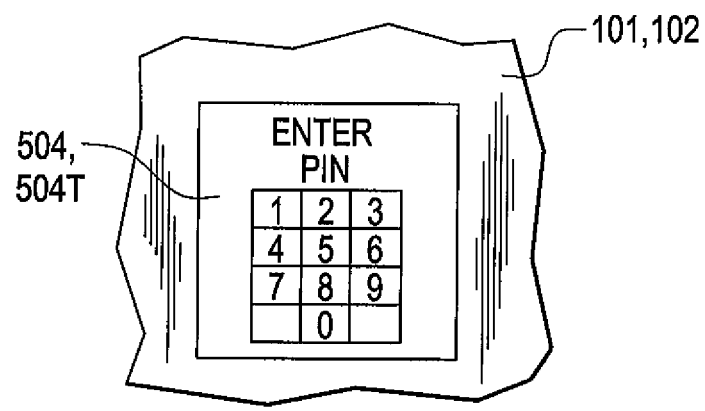
FIGS. 8c and 8d illustrate PIN and signature data entry operational modes of a data collection device according to the invention.
Figure 8D:
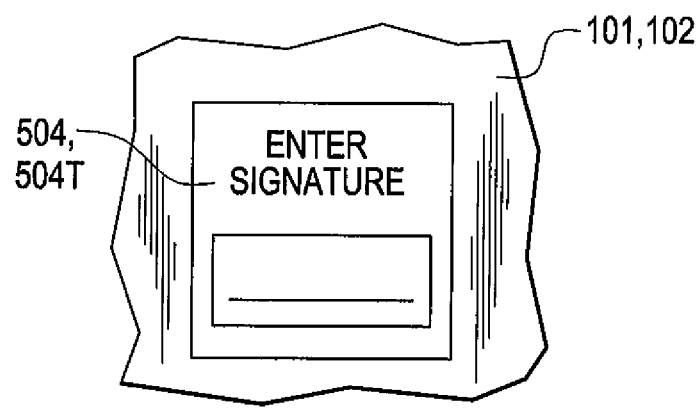

Referring to FIGS. 8a and 8b, various installation configurations for the data collection device of FIGS. 6a-7c are shown. In the view of FIG. 8a, PDT 100 is installed as a retail purchase transaction terminal at a point of sale cashier station 260. In the setup of FIG. 8a, PDT 100 is configured as a retail purchase transaction terminal and is utilized to aid and facilitate retail transactions at a point of sale. A customer may enter a credit card or a debit card into card reader 1348 and retail purchase transaction terminal 100R may transmit the credit card information to credit/debit authorization network.

In the view of FIG. 8b, PDT 100 is configured as a price verifier to aid customers in checking prices of products located on a store floor. PDT 100 may be mounted on a shelf or on a column 264 or other fixed structure of the retail store. PDT 100 may decode bar code data from bar codes on store products and send decoded bar code messages to store server 240 for lookup of price information which is sent back from server 240 to terminal 100 for display on display 504.

A small sample of systems methods and apparatus that are described herein is as follows:

A1. A portable data terminal adapted to participate in a wireless mesh network including a plurality of peer portable data terminals, said portable data terminal comprising:

a portable data terminal module including a central processing unit, a memory, and at least one encoded information reading device configured to output a decoded message data corresponding to an encoded message; and a mesh point module communicatively coupled to said portable data terminal module, said mesh point module including a microcontroller and at least one wireless communication interface;

wherein said mesh point module is configured to perform IEEE 802.11-conformant wireless station services, and IEEE 802.11-conformant wireless distribution system services including distribution and integration;

wherein said mesh point module is further configured, responsive to receiving a Media Access Control frame addressed to a recipient inside said mesh network, to deliver said Media Access Control frame using said distribution service; and wherein said mesh point module is further configured, responsive to receiving a Media Access Control frame addressed to a recipient outside of said mesh network, to deliver said Media Access Control frame using said integration service.

A2. The portable data terminal of A1, wherein said portable data terminal module employs a power management scheme for controlling power management states of said portable data terminal module at least between an awake state and a sleeping state; and wherein said mesh point module is configured to cause said portable data terminal module to exit said portable data terminal module sleeping state by transmitting at least one frame to said portable data terminal module.

A3. The portable data terminal of A1, wherein said portable data terminal module includes a first battery;

wherein said mesh point module includes a second battery; and wherein said first battery is used to power said mesh point module responsive to said second battery depletion, thus providing for uninterrupted operation of said mesh point module.

A4. The portable data terminal of A1, wherein said wireless network comprises one or more portals, each portal routing frames between said wireless network and at least one external network.

A5. The portable data terminal of A1, wherein said mesh point module is configured to transmit beacons only at Delivery Traffic Indication Time intervals.

B1. A portable data terminal adapted to participate in a wireless mesh network including a plurality of peer portable data terminals, said portable data terminal comprising:

a portable data terminal module including a central processing unit, a memory, and at least one encoded information reading device configured to output a decoded message data corresponding to an encoded message; and a mesh point module communicatively coupled to said portable data terminal module, said mesh point module including a microcontroller and at least one wireless communication interface;

wherein said mesh point module is configured to perform IEEE 802.11-conformant wireless station services, and IEEE 802.11-conformant wireless distribution system services;

wherein said mesh point module is further configured, responsive to receiving a Media Access Control frame having a header including a destination address and a frame control field, to route said Media Access Control frame according to said destination address and said frame control field.

B2. The portable data terminal of B1, wherein said portable data terminal module employs a power management scheme for controlling power management states of said portable data terminal module at least between an awake state and a sleeping state; and wherein said mesh point module is configured to cause said portable data terminal module to exit said portable data terminal module sleeping state by transmitting at least one frame to said portable data terminal module.

B3. The portable data terminal of B1, wherein said portable data terminal module includes a first battery;

wherein said mesh point module includes a second battery; and wherein said first battery is used to power said mesh point module responsive to said second battery depletion, thus providing for uninterrupted operation of said mesh point module.

B4. The portable data terminal of B1, wherein said wireless network comprises one or more portals, each portal routing frames between said wireless network and at least one external network.

B5. The portable data terminal of B1, wherein said mesh point module is configured to transmit beacons only at Delivery Traffic Indication Time intervals.

C1. A portable data terminal adapted to participate in a wireless mesh network including a plurality of peer portable data terminals, said portable data terminal comprising:

a portable data terminal module including a central processing unit, a memory, and at least one encoded information reading device configured to output a decoded message data corresponding to an encoded message; and a mesh point module communicatively coupled to said portable data terminal module, said mesh point module including a microcontroller and at least one wireless communication interface;

wherein said portable data terminal module is configured to control power management states of said portable data terminal module at least between an awake state and a sleeping state; and wherein said mesh point module is configured to cause said portable data terminal module to exit said sleeping state responsive to receiving a mobile management software wake-up command.

C2. The portable data terminal of C1, wherein said mesh point module is configured to perform IEEE 802.11-conformant wireless station services including authentication, de-authentication, privacy, and Media Access Control service data unit delivery, and IEEE 802.11-conformant wireless distribution system services including association, disassociation, distribution, integration, and re-association.

C3. The portable data terminal of C1, wherein said portable data terminal module includes a first battery;

wherein said mesh point module includes a second battery; and wherein said first battery is used to power said mesh point module responsive to said second battery depletion, thus providing for uninterrupted operation of said mesh point module.

C4. The portable data terminal of C1, wherein said wireless network comprises one or more portals, each portal routing frames between said wireless network and at least one external network.

C5. The portable data terminal of C1, wherein said mesh point module is configured to transmit beacons only at Delivery Traffic Indication Time intervals.

D1. A dynamic deployable mesh point adapted to participate in a wireless mesh network including a plurality of portable data terminals, said dynamic deployable mesh point comprising:

a microcontroller; and at least one wireless communication interface;

wherein said dynamic deployable mesh point is configured to perform IEEE 802.11-conformant wireless station services including authentication, de-authentication, privacy, and Media Access Control service data unit delivery, and IEEE 802.11-conformant wireless distribution system services including association, disassociation, distribution, integration, and re-association;

wherein said dynamic deployable mesh point is further configured, responsive to receiving a Media Access Control frame addressed to a recipient inside said mesh network, to deliver said Media Access Control frame using said distribution service;

wherein said dynamic deployable mesh point is further configured, responsive to receiving a Media Access Control frame addressed to a recipient outside of said mesh network, to deliver said Media Access Control frame using said integration service; and wherein said dynamic deployable mesh point is substantially devoid of any functionality other than routing Media Access Control frames.

D2. The dynamic deployable mesh point of D1 further comprising a battery.

D3. The dynamic deployable mesh point of D1, wherein said dynamic deployable mesh point is configured to be plugged in an electrical outlet.

D4. The dynamic deployable mesh point of D1 further comprising a routing table;

wherein said dynamic deployable mesh point is configured, responsive to being powered up, to automatically update said routing table.

D5. The dynamic deployable mesh point of D1, wherein said dynamic deployable mesh point is remotely configurable over a network.

While the present invention has been described with reference to a number of specific embodiments, it will be understood that the true spirit and scope of the invention should be determined only with respect to claims that can be supported by the present specification. Further, while in numerous cases herein systems and apparatuses and methods are described as having a certain number of elements, it will be understood that such systems, apparatuses and methods can be practiced with fewer than the mentioned certain number of elements.

The invention claimed is:

1. A portable data terminal adapted to participate in a wireless mesh network including a plurality of peer portable data terminals, said portable data terminal comprising:

a housing;

a portable data terminal disposed within said housing, said portable data terminal module including a central processing unit, a memory, and at least one encoded information reading device configured to output a decoded message data corresponding to an encoded message; and a mesh point module disposed within said housing, said mesh module communicatively coupled to said portable data terminal module, said mesh point module including a microcontroller and at least one wireless communication interface;

wherein said mesh point module is configured to perform IEEE 802.11-conformant wireless station services, and IEEE 802.11-conformant wireless distribution system services including distribution and integration;

wherein said portable data terminal module employs a power management scheme for controlling power management states of said portable data terminal module at least between an awake state and a sleeping state;

wherein said mesh point module is further configured, responsive to receiving, while said portable data terminal module is in a state selected from the group consisting of: said awake state and said sleeping state, a Media Access Control frame addressed to a recipient inside said mesh network, to deliver said Media Access Control frame using said distribution service;

wherein said mesh point module is further configured, responsive to receiving, while said portable data terminal module is in said sleeping state, a Media Access Control frame addressed to a recipient outside of said mesh network, to deliver said Media Access Control frame using said integration service;

wherein said portable data terminal module is further configured to send outgoing Media Access Control frames to said mesh point module and said mesh point module is further configured to route outgoing Media Access Control frames obtained from said portable data terminal to recipients inside said mesh network utilizing said distribution service and to recipients outside said mesh network utilizing said integration service; and wherein said mesh point module is further configured to obtain incoming Media Access Control frames addressed to said mesh point module and transmit said incoming Media Access Control frames to said portable data terminal module.

2. The portable data terminal of claim 1, wherein said mesh point module is further configured, responsive to receiving a Media Access Control frame addressed to said portable data terminal module while said portable data terminal module is in said sleeping state, to cause said portable data terminal module to exit said sleeping state by transmitting said Media Access Control frame to said portable data terminal module; and wherein said mesh point module is further configured, responsive to receiving a Media Access Control frame addressed to said portable data terminal module while said portable data terminal module is in said awake state, to transmit said Media Access Control frame to said portable data terminal module.

3. The portable data terminal of claim 1, wherein said portable data terminal module includes a first battery;

wherein said mesh point module includes a second battery; and wherein said first battery is used to power said mesh point module responsive to said second battery depletion, thus providing for uninterrupted operation of said mesh point module.

4. The portable data terminal of claim 1, wherein said wireless network comprises one or more portals, each portal routing frames between said wireless network and at least one external network.

5. The portable data terminal of claim 1, wherein said mesh point module is configured to transmit beacons only at Delivery Traffic Indication Time intervals.

6. A portable data terminal adapted to participate in a wireless mesh network including a plurality of peer portable data terminals, said portable data terminal comprising:

a housing;

a portable data terminal module disposed within said housing, said portable data terminal including a central processing unit, a memory, and at least one encoded information reading device configured to output a decoded message data corresponding to an encoded message; and a mesh point module disposed within said housing, said mesh point module communicatively coupled to said portable data terminal module, said mesh point module including a microcontroller and at least one wireless communication interface;

wherein said mesh point module is configured to perform IEEE 802.11-conformant wireless station services, and IEEE 802.11-conformant wireless distribution system services;

wherein said mesh point module is further configured, responsive to receiving, while said portable data terminal module is in a state selected from the group consisting of: said awake state and said sleeping state, a Media Access Control frame having a header including a destination address and a frame control field, to route said Media Access Control frame according to said destination address and said frame control field;

wherein said portable data terminal module employs a power management scheme for controlling power management states of said portable data terminal module at least between an awake state and a sleeping state;

wherein said portable data terminal module is further configured to send outgoing Media Access Control frames to said mesh point module and said mesh point module is further configured to route outgoing Media Access Control frames obtained from said portable data terminal to recipients inside said mesh network utilizing said distribution service and to recipients outside said mesh network utilizing said integration service; and wherein said mesh point module is further configured to obtain incoming Media Access Control frames addressed to said mesh point module and transmit said incoming Media Access Control frames to said portable data terminal module.

7. The portable data terminal of claim 6, wherein said mesh point module is further configured, responsive to receiving a Media Access Control frame addressed to said portable data terminal module while said portable data terminal module is in said sleeping state, to cause said portable data terminal module to exit said sleeping state by transmitting said Media Access Control frame to said portable data terminal module; and wherein said mesh point module is further configured, responsive to receiving a Media Access Control frame addressed to said portable data terminal module while said portable data terminal module is in said awake state, to transmit said Media Access Control frame to said portable data terminal module.

8. The portable data terminal of claim 6, wherein said portable data terminal module includes a first battery;

wherein said mesh point module includes a second battery; and wherein said first battery is used to power said mesh point module responsive to said second battery depletion, thus providing for uninterrupted operation of said mesh point module.

9. The portable data terminal of claim 6, wherein said wireless network comprises one or more portals, each portal routing frames between said wireless network and at least one external network.

10. The portable data terminal of claim 6, wherein said mesh point module is configured to transmit beacons only at Delivery Traffic Indication Time intervals.

11. A portable data terminal adapted to participate in a wireless mesh network including a plurality of peer portable data terminals, said portable data terminal comprising:

a housing;

a portable data terminal module disposed within said housing, said portable data terminal including a central processing unit, a memory, and at least one encoded information reading device configured to output a decoded message data corresponding to an encoded message; and a mesh point module disposed within said housing, said mesh point module communicatively coupled to said portable data terminal module, said mesh point module including a microcontroller and at least one wireless communication interface;

wherein said mesh point module is further configured, responsive to receiving, while said portable data terminal module is in a state selected from the group consisting of: said awake state and said sleeping state, a Media Access Control frame having a header including a destination address and a frame control field, to route said Media Access Control frame according to said destination address and said frame control field;

wherein said portable data terminal module is configured to control power management states of said portable data terminal module at least between an awake state and a sleeping state;

wherein said mesh point module is configured to cause said portable data terminal module to exit said sleeping state responsive to receiving from an external server a mobile management software wake-up command;

wherein said portable data terminal module is further configured to send outgoing Media Access Control frames to said mesh point module and said mesh point module is further configured to route outgoing Media Access Control frames obtained from said portable data terminal to recipients inside said mesh network utilizing said distribution service and to recipients outside said mesh network utilizing said integration service; and wherein said mesh point module is further configured to obtain incoming Media Access Control frames addressed to said mesh point module and transmit said incoming Media Access Control frames to said portable data terminal module.

12. The portable data terminal of claim 11, wherein said mesh point module is configured to perform IEEE 802.11-conformant wireless station services including authentication, de-authentication, privacy, and Media Access Control service data unit delivery, and IEEE 802.11-conformant wireless distribution system services including association, disassociation, distribution, integration, and re-association.

13. The portable data terminal of claim 11, wherein said portable data terminal module includes a first battery;

wherein said mesh point module includes a second battery; and wherein said first battery is used to power said mesh point module responsive to said second battery depletion, thus providing for uninterrupted operation of said mesh point module.

14. The portable data terminal of claim 11, wherein said wireless network comprises one or more portals, each portal routing frames between said wireless network and at least one external network.

15. The portable data terminal of claim 11, wherein said mesh point module is configured to transmit beacons only at Delivery Traffic Indication Time intervals.

* * * * *